Aug. 20, 1940. H. M. ULLSTRAND 2,212,281
REFRIGERATION
Filed March 17, 1938
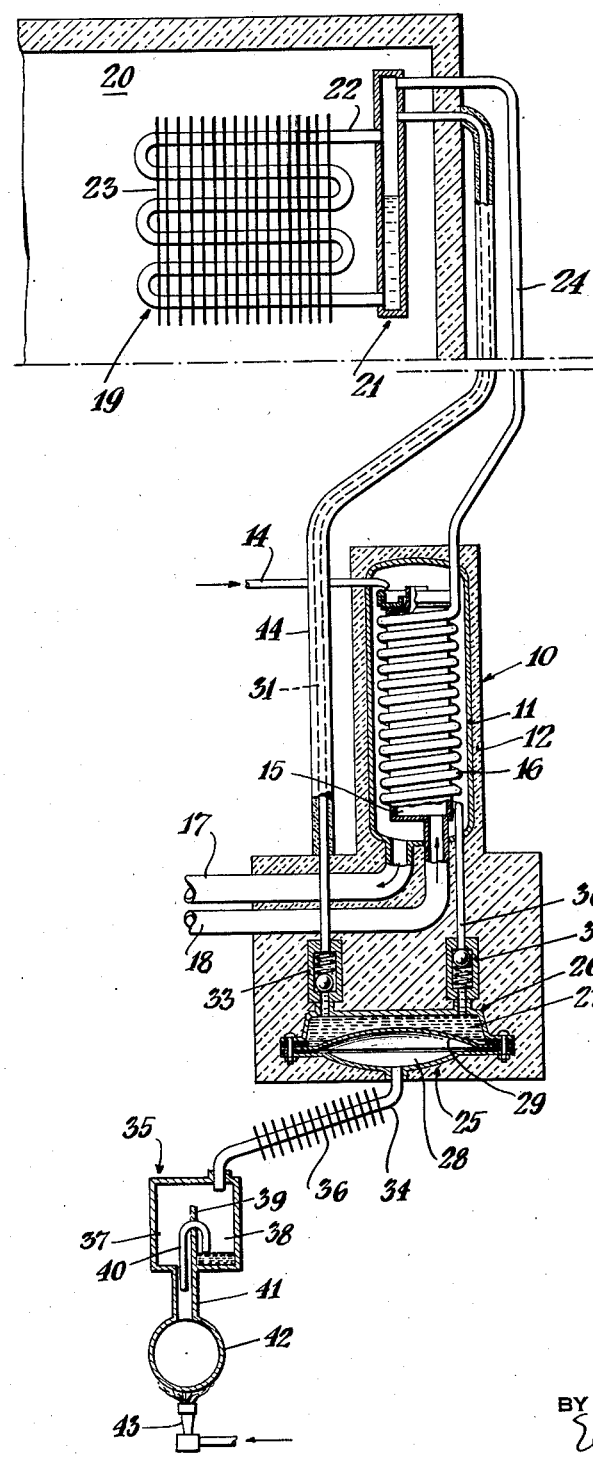
INVENTOR
Hugo M. Ullstrand
BY Ed Fenander
his ATTORNEY Patented Aug. 20, 1940

2,212,281

UNITED STATES PATENT OFFICE 2,212,281

REFRIGERATION

Hugo M. Ullstrand, Evansville, Ind., assignor to Servel, Inc., New York, N. Y., a corporation of Delaware Application March 17, 1938, Serial No. 196,317

11 Claims. (Cl. 62—125)

My invention relates to refrigeration, and has for its object to provide an improved system for transferring heat whereby cooling may be effectively produced at a place above a source of refrigeration.

The above and other objects and advantages of the invention will become apparent from the following description and accompanying drawing forming a part of this specification, and of which the single figure more or less diagrammatically illustrates an embodiment of the invention.

In the drawing is shown a cooling element or evaporator 10 of a refrigeration system of a uniform pressure absorption type, and like that described in application Serial No. 107,852 of Albert R. Thomas, filed October 27, 1936. The cooling element 10 constitutes a source of refrigeration and includes an outer shell 11 which is embedded in insulation 12. Liquid refrigerant, such as ammonia, enters the upper part of cooling element 10 through a conduit 14. An inert gas, such as hydrogen, enters the upper part of the cooling element from the upper end of a cylinder 15 disposed within shell 11. Liquid refrigerant evaporates and diffuses into inert gas within cooling element 10 to produce a refrigerating effect. This refrigerating effect is utilized to cool and liquefy a volatile fluid flowing through a coil 16 which is arranged about cylinder 15 and over which the liquid refrigerant flows.

The disclosure in the aforementioned Thomas application may be considered as being incorporated in this application, and, if desired, reference may be made thereto for a detailed description of the refrigeration system. Briefly, the resulting gas mixture of refrigerant and inert gas flows from cooling element 10 through a conduit 17 to an absorber in which refrigerant is absorbed into a liquid absorbent, such as water. Inert gas weak in refrigerant is returned from the absorber to cooling element 10 through a conduit 18 and cylinder 15.

Absorption liquid enriched in refrigerant is conducted from the absorber to a generator where it is heated and refrigerant is expelled out of solution. Refrigerant vapor expelled out of solution is condensed in a condenser and then returned to cooling element 10 through conduit 14 to complete the refrigerating cycle. The weakened absorption liquid from which refrigerant has been expelled is conducted from the generator to the absorber to again absorb refrigerant gas. In order to simplify the drawing, the absorber, generator, and condenser of the refrigeration system have not been shown, their illustration not being necessary for an understanding of this invention.

The coil 16 constitutes the condenser of a heat transfer system which is formed and arranged so that cooling may be effected at a higher elevation than cooling element 10. The heat transfer system includes an evaporator 19 which is of the flooded type and located at a higher elevation than condenser 16. The evaporator 19 is disposed in a thermally insulated space 20 and includes a receiver 21 having a looped coil 22 connected thereto. A plurality of heat transfer fins 23 are secured to coil 22 to increase the heat transfer surface of the evaporator.

The condenser 16 and evaporator 19 form part of a closed fluid circuit which is partly filled with a suitable volatile fluid, such as methyl chloride, for example, that evaporates in evaporator 19 and takes up heat thereby producing cold. The vapor formed in evaporator 19 flows through a conduit 24 into condenser 16 in which the vapor is cooled and condensed by cooling element 10.

In accordance with my invention, liquid is raised from condenser 16 to evaporator 19 by a liquid lifting device 25. The device 25 includes a two-part casing 26 divided into two chambers 27 and 28 by a flexible diaphragm or partition 29. Liquid flows from condenser 16 through a conduit 30 into upper chamber 27, and liquid is raised from this chamber through a riser conduit 31 into evaporator 19. Check valves 32 and 33 are provided at the lower ends of conduits 30 and 31.

Liquid in upper chamber 27 is raised through conduit 31 into evaporator 19 by movement of flexible diaphragm 29. Movement is imparted to diaphragm 29 by changes in fluid pressure in a closed fluid circuit including lower chamber 28 and a conduit 34 which depends therefrom and is connected at its lower end to the upper part of a vessel 35. A plurality of cooling fins 36 are secured to conduit 34. The vessel 35 is divided into two chambers 37 and 38 by a partition 39. The partition 39 is shorter in height than vessel 35 so that the upper parts of chambers 37 and 38 are in open communication.

Within vessel 35 is disposed an inverted U-shaped siphon tube 40 which extends through an opening in partition 39. One arm of tube 40 extends downward into chamber 38 and terminates in the lower part thereof. The other arm of tube 40 extends downward in chamber 37 and into the upper part of a conduit 41 which is connected to vessel 35. The conduit 41 extends downward from vessel 35 and is connected at its lower end to a boiler 42. The boiler 42 is adapted to be heated in any suitable manner, as by a gas burner 43, for example. The chamber 28, vessel 35, boiler 42, and conduits connecting these parts form a closed fluid circuit which is charged with a predetermined quantity of a suitable volatile liquid.

During operation, vapor formed in evaporator 19 flows through conduit 24 into condenser 16, as explained above. The condensate formed in condenser 16 flows therefrom through conduit 30 into upper chamber 27. Assuming that diaphragm 29 is in the upper position shown in the drawing and that all of the volatile liquid in boiler 42 has been vaporized, the vapor pressure in lower chamber 28 is sufficiently great to flex and move diaphragm 29 from a lower position to the upper position shown. Under these conditions, check valve 32 is closed to prevent upward flow of liquid in conduit 30 and check valve 33 is opened and liquid is raised in riser conduit 31.

After vapor has been formed in boiler 42 and diaphragm 29 has flexed upwardly, condensation of vapor occurs in conduit 34 due to the cooling influence of surrounding air. Condensation of vapor also occurs in lower chamber 28 due to heat transfer to cold liquid in upper chamber 27. The condensate formed in lower chamber 28 and conduit 34 flows downwardly into chamber 38 of vessel 35. With condensation of vapor taking place in the closed fluid circuit, the vapor pressure in lower chamber 28 becomes reduced, whereby diaphragm 29 flexes from its upper position to its lower position. With downward flexing of diaphragm 29 check valve 32 opens, thereby permitting liquid to flow from condenser 16 into upper chamber 27. During this period check valve 33 remains closed so that liquid previously raised in riser conduit 31 cannot flow back into upper chamber 27.

As explained above, the condensate formed in the upper part of the closed fluid circuit flows into the right hand chamber 38 of vessel 35. When the liquid level in chamber 38 rises to the upper end of siphon tube 40, the liquid in chamber 38 is siphoned through tube 40 into conduit 41 and the liquid flows into boiler 42. The flow of liquid stops when the liquid level falls below the lower end of tube 40 in chamber 38.

The liquid in boiler 42 is heated and vaporized due to heating by burner 43, whereby the vapor pressure in the closed fluid circuit again builds up and exerts force on the underside of diaphragm 29 to flex and move the latter to its upper position. During such upward movement of diaphragm 29 check valve 32 is closed and check valve 33 is opened to permit rise of liquid in riser conduit 31. When all of the liquid in boiler 42 has vaporized, the vapor pressure in the closed fluid circuit becomes reduced due to condensation of vapor in conduit 34 and lower chamber 28.

It will now be understood that flexible diaphragm 29 is intermittently actuated by changes in vapor pressure in the closed fluid circuit including lower chamber 28, vessel 35, and boiler 42. By providing the siphon tube 40, condensate is prevented from returning to boiler 42 until substantially all of the volatile liquid has accumulated in chamber 38 of vessel 35. Thus, extremely simple structure has been provided to control automatically the intermittent flexing of diaphragm 29. This permits continuous heating of boiler 43 without any necessity of intermittently shutting off and starting the heat supply to boiler 43.

The closed fluid circuit formed by lower chamber 28, vessel 35, and boiler 42 is preferably charged with such a quantity of volatile liquid that it will all vaporize rapidly when it flows into boiler 42 from vessel 35 through siphon tube 40. Since boiler 42 is heated continuously and a relatively small quantity of volatile liquid is intermittently introduced into boiler 42, the liquid is vaporized practically instantaneously when it flows into boiler 42.

In order to prevent undesirable evaporation of liquid in the heat transfer system, the device 25 and conduit 30, as well as cooling element 10, are preferably embedded in the insulation 12. Likewise, riser conduit 31 is also provided with an insulating covering 44.

While a single embodiment of the invention has been shown and described, such variations and modifications are contemplated which fall within the true spirit and scope of the invention, as pointed out in the following claims.

What is claimed is:

1. A method of heat transfer which includes evaporating a volatile fluid in a place of evaporation at an upper elevation, condensing evaporated fluid in a place of condensation at a lower elevation, and raising condensate between said elevations by producing pulsating force with vaporized fluid out of contact with the condensate, and producing such pulsating force with vaporized fluid formed by intermittent introduction of liquid to a place of vaporization.

2. A method of heat transfer which includes evaporating a volatile fluid in a place of evaporation at an upper elevation, condensing evaporated fluid in a place of condensation at a lower elevation, raising condensate between said elevations by force produced by vaporizing liquid in a place of vaporization during periods alternating with periods in which the vaporized fluid is condensed and accumulates in a place of accumulation, and intermittently introducing liquid to said place of vaporization from said place of accumulation.

3. A heat transfer system comprising a closed fluid circuit partly filled with a volatile liquid and including an evaporator at an upper elevation and a condenser at a lower elevation, a liquid accumulator, a vaporization-condensation member partly filled with a volatile liquid and having a vaporization portion and a condensation portion, said liquid accumulator and vaporization-condensation member being operatively associated whereby liquid in said accumulator is raised between said elevations by force produced by vaporization of volatile liquid in said vaporization portion, and means in said vaporization-condensation member whereby liquid formed therein is intermittently introduced to said vaporization portion.

4. A heat transfer system as set forth in claim 3, in which said means in said vaporization-condensation member for intermittently introducing liquid to said vaporization portion includes a siphon member.

5. A heat transfer system comprising a closed fluid circuit partly filled with a volatile liquid and including an evaporation portion at an upper elevation and a condensation portion at a lower elevation, and structure to raise liquid between said elevations including a liquid accumulator, a place of vaporization in which liquid is vaporized to produce force to lift liquid in said accumulator, and siphon means to introduce liquid intermittently to said place of vaporization.

6. A heat transfer system comprising a closed fluid circuit partly filled with a volatile liquid and including an evaporation portion at an upper elevation and a condensation portion at a lower elevation, structure to raise liquid between said elevations including a liquid accumulator having a flexible wall portion, said wall portion with flexing thereof being operative to exert lifting force on the liquid, and means to flex said wall portion by force produced by vaporization of volatile liquid.

7. A heat transfer system comprising a closed fluid circuit partly filled with a volatile liquid and including an evaporation portion at an upper elevation and a condensation portion at a lower elevation, and structure to raise liquid between said elevations including a liquid accumulator having a flexible wall portion, and fluid pressure means including a closed fluid circuit containing a volatile fluid which undergoes vaporization and condensation, said fluid pressure means being so constructed and arranged that vaporized fluid formed in said circuit is effective to exert force on said flexible wall portion and cause movement of the latter to effect lifting of liquid.

8. A heat transfer system comprising a closed fluid circuit partly filled with a volatile liquid and including an evaporation portion at an upper elevation and a condensation portion at a lower elevation, a first conduit to raise liquid between said elevations, a second conduit to return vapor from said evaporation portion to said condensation portion, structure to raise liquid between said elevations in said first conduit including a liquid accumulator arranged to receive liquid from said condensation portion and having a flexible wall portion, said wall portion with flexing thereof being operative to raise liquid in said first conduit, and means to flex said wall portion by intermittent force produced by intermittent vaporization of volatile liquid.

9. A heat transfer system comprising a closed fluid circuit partly filled with a volatile liquid and including an evaporation portion at an upper elevation and a condensation portion at a lower elevation, structure to raise liquid between said elevations including a liquid accumulator having a flexible wall portion, said wall portion with flexing thereof being operative to exert lifting force on the liquid, and means to flex said wall portion including a closed vaporization-condensation circuit partly filled with a volatile liquid, a part of said circuit being defined by said flexible wall portion.

10. A method of heat transfer which includes evaporating a volatile fluid in a place of evaporation at an upper elevation, condensing evaporated fluid in a place of condensation at a lower elevation, raising condensate between said elevations by force produced by vaporizing liquid in a place of vaporization during periods alternating with periods in which the vaporized fluid is condensed and accumulates in a place of accumulation, and intermittently introducing liquid from said place of accumulation to said place of vaporization.

11. A heat transfer system comprising a closed fluid circuit partly filled with a volatile fluid and including an evaporation portion at an upper elevation and a condensation portion at a lower elevation, and a structure to raise liquid between said elevations including a liquid accumulator, a place of vaporization, and means to intermittently introduce liquid into said place of vaporization and expel the liquid in vapor form therefrom to produce pulsating force to lift liquid in said accumulator, said vapor which is formed in said place of vaporization always remaining out of contact with liquid being lifted.

HUGO M. ULLSTRAND.